United States Patent [19]

Chan

[11] Patent Number: 5,082,896

[45] Date of Patent: Jan. 21, 1992

[54] POLYMERIC MATERIALS USEFUL FOR SIZING SYNTHETIC YARNS TO BE USED IN WATER JET WEAVING

[75] Inventor: Marie S. Chan, Forest City, N.C.

[73] Assignee: Milliken Research Corporation, Spartanburg, S.C.

[21] Appl. No.: 297,725

[22] Filed: Jan. 17, 1989

[51] Int. Cl.$^5$ .............................................. C08L 33/06
[52] U.S. Cl. ...................................... 524/823; 106/285
[58] Field of Search ................... 526/318.44; 524/823; 106/285

[56] References Cited

U.S. PATENT DOCUMENTS

| | | | |
|---|---|---|---|
| 2,727,835 | 12/1955 | Barrett | 117/138.8 |
| 2,794,742 | 6/1957 | Fowler, Jr. et al. | 526/318.44 |
| 2,807,865 | 10/1957 | Shippee et al. | 28/76 |
| 2,884,336 | 4/1959 | Loshaek et al. | 526/318.44 |
| 2,962,465 | 11/1960 | Lindstrom et al. | 524/823 |
| 3,654,213 | 4/1972 | Christenson et al. | 526/318.44 |
| 3,759,858 | 9/1973 | Corey et al. | 526/318.44 |
| 3,811,981 | 5/1974 | Guillaume et al. | 526/318.44 |
| 3,879,357 | 4/1975 | Wingler et al. | 526/318.44 |
| 3,974,321 | 8/1976 | Baron, Jr. et al. | 428/395 |
| 4,015,317 | 4/1977 | Johnsen | 28/72.6 |
| 4,394,128 | 7/1983 | Morris | 8/138 |
| 4,448,839 | 5/1984 | Morris | 428/267 |

FOREIGN PATENT DOCUMENTS

| | | | |
|---|---|---|---|
| 2354581 | 5/1975 | Fed. Rep. of Germany | 524/823 |
| 0200620 | 5/1983 | Fed. Rep. of Germany | 524/823 |
| 52-3631 | 1/1977 | Japan | 526/318.44 |
| 928251 | 6/1963 | United Kingdom | 524/823 |
| 2070631 | 9/1981 | United Kingdom | 526/318.44 |

*Primary Examiner*—Joseph L. Schofer
*Assistant Examiner*—N. Sarofim
*Attorney, Agent, or Firm*—Timothy J. Monahan; H. William Petry

[57] ABSTRACT

A polymeric material is provided which comprises the following monomer units: from about 23 to about 32 parts by weight butyl acrylate; from about 16 to about 22 parts by weight of a lower alkyl methacrylate; from about 28 to about 40 parts by weight of a monomer selected from vinyl acetate and styrene; and from about 14 to about 20 parts by weight of an acidic monomer selected from acrylic acid and methacrylic acid; said polymer being further characterized as having an intrinsic viscosity of from about 0.16 to about 0.30 deciliter per gram as measured by a Cannon-Fenske Kinematic viscometer.

17 Claims, No Drawings

POLYMERIC MATERIALS USEFUL FOR SIZING SYNTHETIC YARNS TO BE USED IN WATER JET WEAVING

The present invention relates to polymeric materials and to sizing compositions containing such materials for synthetic yarns. More particularly, the present invention relates to polymeric materials and sizing compositions useful for sizing synthetic yarns to be used in water jet weaving operations.

A warp size is a chemical applied to a yarn comprising a warp for the purposes of protecting the yarn during subsequent handling and weaving. In these operations the yarns running in the warp direction are subjected to considerable abrasion from guide surfaces, drop wires, heddles, reed, shuttle and adjacent yarns. On a staple fiber yarn such as cotton, the size coats the yarn, protects it against abrasion and covers up such warp defects as knots, crossed ends, slubs and weak spots which occur in the normal variation of textile production. This is accomplished because the size glues down the protruding fibers, and provides an abrasion resistant coating for the fibers. On a filament yarn, the size coats the yarn and cements the filaments together to form essentially a monofilament yarn, thereby preventing chafing between filaments and between the yarn and guide surfaces.

Sizes such as corn starch, gelatin, carboxy methyl cellulose, polyvinyl alcohol, polyacrylic acid and styrene/maleic anhydride copolymers and alkali metal salts of ethylene/acrylic acid copolymers are conventionally employed as warp sizes for weaving on conventional fly shuttle looms as well as the more modern shuttleless rapier and projectile looms. However, due to the sensitivity of the conventional sizes to moisture, the weaver must carefully control weave room humidity to optimum levels for the size being used. This water sensitivity of conventional sizes renders such sizes totally unacceptable as sizes for warps to be woven on modern water jet looms.

In a water jet loom, a high pressure jet of water is used to carry the weft yarn through the loom shed, thereby forming the pick. During this operation, the warp yarn becomes saturated with water. If the warp yarn has been sized with conventional, water sensitive sizings, the size soon becomes water swollen and gummy, causing yarn-to-yarn entanglement and size buildup at the heddle eyes and reed. Under such conditions, spun warp yarns break and filament yarns entangle, either of which necessitate stopping the loom, often also causing defects in the fabric. In view of the difficulties resulting from the use of conventional sizes on the water jet loom, weavers wishing to utilize the water jet loom must either use a relatively high twist unsized filament yarn or a low twist filament yarn sized with a water-insensitive composition. Use of a high twist yarn is feasible only in the manufacture of a few types of cloth, thus limiting the versatility of the water jet loom. Unfortunately, the water-insensitive sizes now being employed in the manufacture of fabrics employing low twist filament yarns are not totally water-insensitive and do not adhere well to the yarn. Such sizes may also, of course, be difficult to remove in subsequent desizing operations.

In view of these difficulties existing in the weaving of textile fibers by water-jet looms, it would be highly desirable to provide improved polymers, sizing compositions and processes for sizing textile fibers for use in weaving with water-jet looms and, subsequently, to desize the woven material.

Advantages achieved by means of the subject matter of the present invention include excellent adhesion of the sizing composition to the textile yarns during the sizing and weaving processes. The sizing compositions of the present invention, furthermore, may withstand the high humidity of water-jet weaving locations without causing sized yarn to block in the beam as a result of high pressure winding. The sizing compositions of the present invention may also be easily removed by conventional scouring techniques using alkaline conditions after weaving so that the fabric may be further processed. The sizing compositions of the present invention exhibit excellent adhesion to a wide variety of synthetic fibers including polyester, nylon, aramide, acetate, and other fibers; they exhibit no blocking under high humidity and pressure conditions and can be easily removed under mildly alkaline conditions and moderate temperatures encountered in normal desizing operations.

According to the invention a polymeric material useful in a sizing composition for sizing textile fibers to be employed in weaving with water-jet looms is provided which comprises monomer units as follows:
a.) from about 23 to about 32 parts by weight butyl acrylate;
b.) from about 16 to about 22 parts by weight of a lower alkyl methacrylate;
c.) from about 28 to about 40 parts by weight of a monomer selected from vinyl acetate and styrene; and
d.) from about 14 to about 20 parts by weight of an acidic monomer selected from acrylic acid and methacrylic acid;

said polymer being further characterized as having an intrinsic viscosity of from about 0.16 to about 0.30 deciliter per gram as measured by a Cannon-Fenske Kinematic viscometer.

According to an embodiment of the invention, a sizing composition is provided for sizing textile fibers to be employed in weaving with water-jet looms which comprises an aqueous dispersion of from about 5 to about 40 parts by weight of a polymer as defined above, said composition having been adjusted to a pH of from about 6 to about 8 and a low molecular weight alcohol present in an amount to provide a bulk viscosity of less than 2000 centipoise as measured by a Brookfield LTV viscometer.

According to yet a further embodiment of the present invention, a process for sizing textile fibers to be employed in weaving with water-jet looms is provided which comprises applying to the fibers to be employed in the water-jet weaving operation a sizing composition as described above so as to deposit from about 1 to about 15 parts by weight of the polymer based upon the weight of the yarn, weaving said material on a water-jet loom and thereafter removing said sizing composition by conventional desizing operations employing mildly alkaline conditions and moderate temperatures.

DETAILED DESCRIPTION OF THE INVENTION

The polymeric materials of the present invention may be made by conventional free radical emulsion polymerization techniques which will be readily familiar to those skilled in this particular art. As used herein, the term polymer is intended to include homopolymers and copolymers made from two or more monomeric materials.

Butyl acrylate units are provided in the polymeric material to impart film forming characteristics to the polymer which is essential to achieving the desired continuous coverage of the yarn substrate. The proportion of butyl acrylate monomer units in the polymer may range from about 23 to 32 parts by weight based upon the weight of the polymer, preferably from about 24 to about 31 parts by weight, most preferably from about 25 to about 30 parts by weight.

Lower alkyl methacrylate monomer units are present in the polymeric material to reduce the tack of the polymer thus eliminating the tendency of the polymer to "block." The amount of lower alkyl methacrylate may be from about 16 to about 22 parts by weight based upon the weight of the polymeric material, preferably from about 17 to about 21 parts by weight, most preferably from about 18 to about 20 parts by weight. Typical lower alkyl methacrylate units which may be employed include isobutyl methacrylate, which is preferred, as well as butyl methacrylate and n-propyl methacrylate. Other lower alkyl methacrylates having high glass transition temperatures (herein Tg) may also be used. As used herein, the term "lower alkyl" is intended to include alkyl units having from 1 to about 6 carbon atoms.

The vinyl acetate and/or styrene monomer units are present in the polymeric material to promote adhesion to the fiber substrates, in particular, polyester and acetate substrates and also to reduce the tack of the polymer. These monomer units may be present in the polymeric material in an amount of from about 28 to 40 parts by weight based upon the weight of the polymer, preferably from about 29 to about 38 parts by weight, and most preferably, from about 30 to about 36 parts by weight. Styrene and/or vinyl acetate monomer units may be used as this monomeric component although vinyl acetate is preferred.

An acidic monomer is also employed, preferably acrylic acid or methacrylic acid and these monomers are used to promote adhesion to, for instance, nylon substrates. Such monomer units are also present in order to impart alkaline scourability to the polymeric material which, obviously, is necessary in order to remove the sizing composition during conventional alkaline scouring processing. The amount of such monomer units present in the polymer may be from about 14 to about 20 parts by weight, preferably from about 15 to about 19 parts by weight, most preferably from about 16 to about 18 parts by weight based upon the weight of the polymeric material.

The polymeric material of the present invention is prepared, as mentioned above, by conventional free radical polymerization techniques using a technique known in the art as delayed pre-emulsion addition. Such technique typically involves charging of water to a reactor which is then heated with nitrogen purge to about 60°-65° C. A pre-emulsion is prepared using water, a suitable surfactant, and the desired monomers. A chain transfer agent may then be added to control the molecular weight. Polymerization is initiated by a redox system such as potassium or ammonium persulfate, sodium bisulfite, sodium metabisulfite or sodium formaldehydesulfoxalate. The reaction temperature is then held typically at about 75° C. while the pre-emulsion and redox initiators are fed continuously into the reactor.

When the reaction is complete the polymeric materials generally have a pH in the range of from about 2 to about 4. In order to prevent corrosion of pipelines and equipment, ammonia may be added to neutralize the emulsion polymer to a pH of from about 6 to about 8. The bulk viscosity of the latex increases dramatically upon neutralization and may be controlled by the addition of, for instance, from about 1 to about 5 percent by weight based upon the weight of the composition of a low molecular weight alcohol such as methanol or isopropanol, or a water miscible solvent such as acetone or ethyl acetate.

The sizing composition of the present invention may be applied to the yarn by either conventional or single end sizing techniques. The amount of polymeric material applied to the yarn may range from about 1 to about 15 percent by weight based upon the weight of the yarn depending on the nature of the yarn, the denier, the amount of twist, the degree of texturizing, etc. After the sizing composition has been applied to the yarn drying may be accomplished by simply heating the yarn in air and/or drying cans. Oven drying may also be employed at temperatures ranging from about 70° to about 135° C. When using drying cans, a temperature profile of from about 80° to about 110° C. may typically be employed.

The invention may be further understood by reference to the following examples which are not to be construed as limiting the subject matter of the present invention as claimed in the claims appended hereto. Unless otherwise indicated all parts and percentages are by weight. In the examples and tables the following abbreviations have been used:

| AA = acrylic acid | MAA = methacrylic acid |
|---|---|
| ACN = acrylonitrile | MMA = methyl methacrylate |
| BA = butyl acrylate | ST = styrene |
| iBMA = isobutyl methacrylate | |

SIZE EVALUATION PROCEDURE

A. Size dots are generated by dropping three percent active size solutions onto polyester, nylon or acetate films. The dots are placed about one inch apart. The dots are air dried and then cured in a 115° C. oven for 15 minutes. The film and dots are then conditioned at ambient atmosphere for at least one hour prior to testing.

1. Adhesion test

Five dots are scored by a razor blade in a crisscross fashion without cutting through the substrate film. A piece of adhesive scotch tape is pressed onto the dots and then lifted from the dots quickly. The adhesion is defined as the percentage of the dot sectors which remain on the film.

2. Water sensitivity test

A section of the film with size dots is immersed in 25° to 30° C. water for 15 minutes. The dots are evaluated for clarity, toughness and adhesion. The water sensitivity rating of one to five is judged as follows:

1—totally unaffected, no change in appearance and toughness
2—slightly attacked (cloudy) but does not soften
3—softened, can be scraped off by spatula
4—softened, can be wiped off by finger
5—totally dissolved, dot disappeared For the polymer to be an effective water-jet size, the water sensitivity rating has to be one or two, preferably one.

3. Face-to-face blocking

Films are placed together with the size dots facing each other and a 140 gram weight is placed on top of each pair of dots. The assembly is then placed in a closed chamber at room temperature (25° C.) with 100% relative humidity maintained by a dish of water. After 16 hours the films are peeled apart. The degree of sticking is noted and the amount of the dots transferred to the other film is visually judged:

0% blocking=dots peeled apart easily with no transfer

100% blocking=one dot totally transferred to the other dot, or the dots are stuck together and cannot be peeled apart For a size to resist blocking in a water-jet weaving location even at high add-on, less than 10% blocking in this test is desired.

B. Size Removal Test

Size films are prepared by depositing the size compound containing 0.1 gram active solids onto the substrate film over an area of 4.5 cm$^2$. The size films were air dried and then cured in a 115° C. oven for 15 minutes and then conditioned at ambient atmosphere for at least one hour.

1. Desizing Procedure

A desizing bath containing one liter of tap water, 2.5 g of soda ash and one gram of a nonylphenol ethoxylate nonionic surfactant is heated to 50° or 70° C. The substrate film supporting the size film is immersed in the desizing bath and stirred occasionally. The time required for the entire size film to dissolve is recorded.

From plant experience, a size with desizing times of ten minutes at 50° C. and six minutes at 70° C. by this test performs adequately in an actual desizing operation. In contrast, a size with desizing times of 35 minutes at 50° C. and 30 minutes at 70° C. by this test cannot be totally removed under normal plant scouring procedures.

It is noted that the time required to dissolve the size film is independent of the nature of the substrate within the realm of experimental error.

EXAMPLE 1

BA/VAc/iBMA/MAA 30/35/18/17

A one liter glass reactor is equipped with an agitator and addition funnel, thermometer, and nitrogen inlet tube. 191 grams of water is charged and heated to 65° C. with nitrogen purge. A pre-emulsion is made by adding 43 grams of butyl acrylate, 26 grams of isobutyl methacrylate, 50 grams of vinyl acetate, and 25 grams of methacrylic acid and 0.45 grams of n-dodecylmercaptan to a solution of 89 grams of water and 14 grams of a surfactant of a sodium salt of sulfosuccinic acid half ester, the pre-emulsion is then placed in the addition funnel.

An initiator solution is prepared by dissolving 0.9 grams potassium persulfate in 47 grams water. A catalyst solution is prepared by dissolving 0.27 grams sodium bisulfite in 13 grams water. The reaction is initiated by adding 15% of the pre-emulsion to the reactor followed by all the initiator solution and 20% of the catalyst solution. A gradual temperature rise to 70°-75° C. will occur. Maintain the reactor temperature at this range and add the remaining pre-emulsion and catalyst solution to the reactor over 90 to 100 minutes.

When the reaction is complete add a solution of 8.2g aqueous ammonia, 22 grams isopropanol, and 242 grams water to the reactor. When mixing is complete cool and discharge.

This composition contains 20% polymer solids, has lower than 100 centipoise viscosity, a pH at 7.2, and an intrinsic viscosity of 0.18 dl/g. Molecular weight determined by gel permeation chromatography is 1.4 million.

EXAMPLE 2

BA/VAc/iBMA/MAA 25/40/21/14

The same procedure in Example 1 is carried out using 36 g of butyl acrylate, 30.2 g of isobutyl methacrylate, 57.5 g of vinyl acetate, and 20.1 g of methacrylic acid.

EXAMPLE 3

BA/St/MAA 51/37/12

The same procedure is carried out using 76.5 g of butyl acrylate, 55.5 g of styrene and 18 g of methacrylic acid. 0.3 g of n-dodecylmercaptan was used and the neutralization step was not carried out due to the high viscosity of the final product.

EXAMPLE 4

A size with the copolymer composition of BA/VAc/iBMA/MAA 30/35/18/17 was applied to textured polyester using conventional sizing method. Size add-on was 8% by weight of the fiber. The warp was woven on a Nissan W51 water-jet machine. We obtained a warp stop level of 0.0088/mpx and a mechanical stop level of 0.0023/mpx. Six thousand yards were run over three weeks and no wash-off was noted during slashing or weaving. On the weaving machine, the drop-wires, the heddles and reeds were free from wash-off. The loom beams exhibited no blocking and no blistering; whereas beams using Permaloid 172, an acrylic copolymer manufactured by North Chemical Company, run concurrently with our test beams showed some blocking.

TABLE I

| | SIZE EVALUATION - ON POLYESTER SUBSTRATE | | | | | | |
|---|---|---|---|---|---|---|---|
| POLYMER | COMPOSITION | $[\eta]$ (dl/g) INTRINSIC VISCOSITY | % ADHESION | WATER SENSITIVITY | % BLOCKING | DESIZABILITY (MIN) 50 C. | 70 C. |
| BA/VAc/iBMA/MAA | 30/35/18/17 | 0.30 | 85 | 1 | 0 | 21 | 11 |
| | | 0.24 | 95 | 1 | 0 | 12 | 10 |
| Example 1 | | 0.22 | 95 | 1 | 0 | 12 | 10 |
| | | 0.18 | 90 | 1 | 10 | 12 | 10 |
| | | 0.14 | 25 | 1 | 0 | 23 | 12 |
| | 34/35/14/17 | 0.29 | 25 | 1 | 40 | 9 | 6 |
| | | 0.27 | 30 | 1 | 40 | 9 | 6 |
| | 37/35/11/17 | 0.30 | 50 | 1 | 70 | 28 | 25 |
| | 39/30/14/17 | 0.16 | 75 | 1 | 50 | 11 | 6 |
| | 42/35/6/17 | | 90 | 1 | 50 | 35 | 20 |

TABLE I-continued

SIZE EVALUATION - ON POLYESTER SUBSTRATE

| POLYMER | COMPOSITION | [η] (dl/g) INTRINSIC VISCOSITY | % ADHESION | WATER SENSITIVITY | % BLOCKING | DESIZABILITY (MIN) 50 C. | 70 C. |
|---|---|---|---|---|---|---|---|
| | 27/38/20/15 | 0.20 | 85 | 1 | 0 | 24 | 19 |
| | 34/29/22/15 | 0.19 | 85 | 1 | 90 | 14 | 11 |
| | 30/26/24/20 | 0.27 | 0 | 1 | 5 | 8 | 6 |
| Example 2 | 25/40/21/14 | 0.18 | 50 | 1 | 0 | 10 | 7 |
| BA/iBMA/MAA | 45/38/17 | 0.20 | 80 | 1 | 40 | 45 | 40 |
| BA/VAc/ACN/MAA | 45/32/8/15 | | 95 | 2 | 80 | 28 | 22 |
| BA/VAc/St/MAA | 44/29/10/17 | | 75 | 1 | 80 | 19 | 11 |
| BA/VAc/MAA | 48/35/17 | | 75 | 1 | 60 | 34 | 30 |
| | 48/38/14 | | 95 | 2 | 90 | 37 | 29 |
| | 45/38/17 | | 55 | 1 | 50 | 32 | 30 |
| BA/VAc/MMA/MAA | 46/32/5/17 | | 95 | 1 | 70 | 20 | 11 |
| BA/EA/VAc/MAA | 24/24/35/17 | | 75 | 1 | 70 | 37 | 33 |
| BA/VAc/ACN/AA | 48/25/10/17 | | 50 | 3 | 90 | 9 | 7 |
| | 52/25/6/17 | | 35 | 4 | 70 | | |
| BA/VAc/MMA/ACN/ | 43/29/5/6/17 | | 30 | 2 | 90 | 29 | 25 |
| BA/St/AA | 51/37/12 | | 100 | 1 | 50 | >60 | >60 |
| BA/St/MAA | 51/37/12 | | 95 | 1 | 0 | >60 | >60 |
| Example 3 | | | | | | | |
| BA/MMA/AA | 51/37/12 | | 85 | 2 | 80 | >60 | 41 |
| BA/MMA/MAA | 51/37/12 | | 25 | 2 | 80 | >60 | 33 |

TABLE II

PERFORMANCE COMPARISON WITH OTHER PRODUCTS

| PRODUCT | ON POLYESTER | | | ON NYLON | | | DESIZING (MIN) | |
|---|---|---|---|---|---|---|---|---|
| | % ADHESION | WATER SENS. | % BLOCK | % ADHESION | WATER SENS. | % BLOCK | 50° C. | 70° C. |
| Example 1 | 95 | 1 | 0 | 100 | 2 | 0 | 12 | 10 |
| Abco FZ-47 | 30 | 2 | 0 | 90 | 3 | 0 | 34 | 31 |
| Permaloid 172 | 30 | 2 | 5 | 100 | 3 | 10 | 7 | 5 |
| Abco BY-4 | 0 | 1 | 0 | 50 | 2 | 0 | 10 | 6 |
| BA/St/AA 51/37/12 | 100 | 1 | 50 | 100 | 1 | 50 | >60 | >60 |
| BA/St/MAA 51/37/12 | 95 | 1 | 0 | 95 | 1 | 0 | >60 | >60 |
| BA/MMA/AA 51/37/12 | 85 | 2 | 80 | 100 | 2 | 70 | >60 | 41 |
| BA/MMA/MAA 51/37/12 | 25 | 2 | 80 | 60 | 2 | 80 | >60 | 33 |

I claim:

1. A sizing composition which comprises an aqueous dispersion of from about 5 to about 40 parts by weight of a polymer made from the following monomer units:
   a.) from about 23 to about 32 parts by weight butyl acrylate;
   b.) from about 16 to about 22 parts by weight of a lower alkyl methacrylate;
   c.) from about 28 to about 40 parts by weight of a monomer selected from vinyl acetate and styrene; and
   d.) from about 14 to about 20 parts by weight of an acidic monomer selected from acrylic acid and methacrylic acid; said polymer being further characterized as having an intrinsic viscosity of from about 0.16 to about 0.30 deciliter per gram as measured by a Cannon-Fenske Kinematic viscometer, said composition having been adjusted to a pH of from about 6 to about 8 and a bulk viscosity of less than about 2,000 centipoise as measured by a Brookfield LTV viscometer.

2. The sizing composition of claim 1 wherein said lower alkyl methacrylate is isobutyl methacrylate.

3. The sizing composition of claim 1 wherein said monomer selected from vinyl acetate and styrene is vinyl acetate.

4. The sizing composition of claim 1 wherein said acidic monomer is methacrylic acid.

5. A sizing composition which comprises an aqueous dispersion of from about 5 to about 40 parts by weight of a polymer made from the following monomer units:
   (a) from about 23 to about 32 parts by weight butyl acrylate;
   (b) from about 16 to about 22 parts by weight of a lower alkyl methacrylate;
   (c) from about 28 to about 40 parts by weight of a monomer selected from vinyl acetate and styrene; and
   (d) from about 14 to about 20 parts by weight of an acidic monomer selected from acrylic acid and methacrylic acid.

6. The sizing composition of claim 5 wherein said monomer selected from vinyl acetate and styrene is vinyl acetate.

7. The sizing composition of claim 6 wherein said lower alkyl methacrylate is isobutyl methacrylate.

8. The sizing composition of claim 6 wherein said acidic monomer is methacrylic acid.

9. The sizing composition of claim 6 wherein said composition has a bulk viscosity of less than about 2,000 centipoise as measured by a Brookfield LTV viscometer.

10. The sizing composition of claim 9 wherein said composition has been adjusted to a pH of from about 6 to about 8.

11. The sizing composition of claim 6 wherein said aqueous dispersion is a latex.

12. A sized textile fiber, comprising:
    (a) a textile fiber;
    (b) polymer coating on said fiber, said polymer having been made from the following monomer units:

(i) from about 23 to about 32 parts by weight butyl acrylate;
(ii) from about 16 to about 22 parts by weight of a lower alkyl methacrylate;
(iii) from about 28 to about 40 parts by weight of a monomer selected from vinyl acetate and styrene; and
(iv) from about 14 to about 20 parts by weight of an acidic monomer selected from acrylic acid and methacrylic acid.

13. A sized textile fiber according to claim 12 wherein said polymer coating ranges from about 1 to 15 parts per 100 parts of said fiber by weight.

14. A sized textile fiber according to claim 13 wherein said fiber is selected from polyester, nylon, aramide and acetate synthetic fibers.

15. A sized textile fiber according to claim 13 wherein said monomer selected from vinyl acetate and styrene is vinyl acetate.

16. A sized textile fiber according to claim 15 wherein said polymer is applied to said fiber as an aqueous dispersion of from about 5 to about 40 parts by weight of said polymer.

17. A sized textile fiber according to claim 16 wherein said aqueous dispersion is a latex.

* * * * *